(12) United States Patent
Aviv

(10) Patent No.: US 7,487,435 B2
(45) Date of Patent: Feb. 3, 2009

(54) METHOD AND SYSTEM FOR CONDUCTING AN ON-LINE SURVEY

(75) Inventor: Ronit Aviv, Holmdel, NJ (US)

(73) Assignee: Dynamic Logic, Inc., New York, NY (US)

( * ) Notice: Subject to any disclaimer, the term of this patent is extended or adjusted under 35 U.S.C. 154(b) by 278 days.

(21) Appl. No.: 11/004,074

(22) Filed: Dec. 3, 2004

(65) Prior Publication Data

US 2005/0132267 A1 Jun. 16, 2005

Related U.S. Application Data

(60) Provisional application No. 60/529,358, filed on Dec. 12, 2003.

(51) Int. Cl.
*G06F 17/24* (2006.01)
*G06F 15/16* (2006.01)

(52) U.S. Cl. ............... 715/205; 715/202; 715/234; 715/253; 709/203; 705/10; 717/115

(58) Field of Classification Search .......... 715/500, 715/501.1, 513, 526, 200–202, 205, 226, 715/234, 240, 253, 255, 256, 273, 760, 762; 709/202, 203, 218; 705/10, 14; 717/106, 717/111, 114, 115
See application file for complete search history.

(56) References Cited

U.S. PATENT DOCUMENTS

| 5,692,125 | A | * | 11/1997 | Schloss et al. ............ 705/9 |
| 5,724,521 | A | | 3/1998 | Dedrick |
| 5,794,210 | A | | 8/1998 | Goldhaber et al. |
| 5,838,790 | A | | 11/1998 | McAuliffe et al. |
| 5,848,397 | A | | 12/1998 | Marsh et al. |
| 5,893,098 | A | * | 4/1999 | Peters et al. ............ 707/10 |
| 5,918,014 | A | | 6/1999 | Robinson |

(Continued)

FOREIGN PATENT DOCUMENTS

WO WO-96/08779 A1 * 3/1995

(Continued)

OTHER PUBLICATIONS

Roztocki et al., "Is the Applicability of Web-Based Surveys for Academic Research limited to the Field of Information Technology?," Proceedings of the 36th Hawaii International Conference on System Sciences, IEEE, Jan. 2003, pp. 1-8.*

(Continued)

*Primary Examiner*—Doug Hutton
*Assistant Examiner*—Maikhanh Nguyen
(74) *Attorney, Agent, or Firm*—Leydig, Voit & Mayer Ltd.

(57) ABSTRACT

A method and system for conducting an on-line survey involves communicating with a computer over a computer network and obtaining information indicative of an instruction to replace a set of links within a first web page with a link relating to taking an on-line survey. After replacing the set of links, when one of the replaced links is selected, a second page relating to the on-line survey is displayed. The second page includes a link to a page associated with a link replaced by the selected link, thereby enabling a user to easily continue to an intended page instead of taking the on-line survey.

16 Claims, 11 Drawing Sheets

U.S. PATENT DOCUMENTS

| | | | |
|---|---|---|---|
| 5,948,061 | A | 9/1999 | Merriman et al. |
| 5,956,709 | A | 9/1999 | Xue |
| 6,006,197 | A | 12/1999 | d'Eon et al. |
| 6,009,410 | A | 12/1999 | LeMole et al. |
| 6,070,145 | A | 5/2000 | Pinsley et al. |
| 6,093,026 | A * | 7/2000 | Walker et al. ............... 434/322 |
| 6,138,155 | A | 10/2000 | Davis et al. |
| 6,189,029 | B1 * | 2/2001 | Fuerst ......................... 709/217 |
| 6,199,106 | B1 * | 3/2001 | Shaw et al. .................. 709/217 |
| 6,381,744 | B2 * | 4/2002 | Nanos et al. ................... 725/24 |
| 6,401,138 | B1 * | 6/2002 | Judge et al. .................. 719/328 |
| 6,477,504 | B1 * | 11/2002 | Hamlin et al. ................. 705/10 |
| 6,616,458 | B1 * | 9/2003 | Walker et al. ............... 434/322 |
| 6,618,746 | B2 * | 9/2003 | Desai et al. .................. 709/204 |
| 6,662,192 | B1 | 12/2003 | Rebane |
| 6,714,913 | B2 * | 3/2004 | Brandt et al. ................... 705/2 |
| 6,728,755 | B1 * | 4/2004 | de Ment ...................... 709/203 |
| 6,754,676 | B2 * | 6/2004 | Dietz et al. .............. 707/104.1 |
| 6,826,540 | B1 * | 11/2004 | Plantec et al. ................. 705/10 |
| 6,993,495 | B2 * | 1/2006 | Smith et al. ................... 705/10 |
| 2002/0002482 | A1 * | 1/2002 | Thomas ....................... 705/10 |
| 2002/0095431 | A1 * | 7/2002 | Mc George et al. ......... 707/200 |
| 2002/0128898 | A1 * | 9/2002 | Smith et al. ................... 705/10 |
| 2003/0120687 | A1 * | 6/2003 | Solomon et al. ............ 707/200 |
| 2004/0128183 | A1 * | 7/2004 | Challey et al. ................ 705/10 |
| 2005/0091111 | A1 * | 4/2005 | Green et al. .................. 705/14 |
| 2005/0138633 | A1 * | 6/2005 | Barsade et al. .............. 719/313 |

FOREIGN PATENT DOCUMENTS

| | | | |
|---|---|---|---|
| WO | WO 97/22074 | * | 6/1997 |
| WO | WO 97/22074 A1 | | 6/1997 |
| WO | WO 97/40514 | * | 10/1997 |
| WO | WO 97/40514 A1 | | 10/1997 |

OTHER PUBLICATIONS

Dennis et al., "InternetQuestion and Answer (iQ&A): A Web-Based Survey Technology," Information Technology in Biomedicine, IEEE, vol. 4, No. 2, Jun. 2000, pp. 116-125.*

Pargas et al., "OnQ: An Authoring Tool for Dynamic Online Surveys," Proceedings of the International Conference on Information Technology in Computers and Communications, Apr. 2003, pp. 717-723.*

Pargas et al., "Database Design for Dynamic Online Surveys," Proceedings of the International Conference on Information Technology in Computers and Communications, Apr. 2003, pp. 665-671.*

Y. Song, "Proof That Online Advertising Works," Director of Analytics & Atlas Institute, retrieved from www.google.com, 2001, pp. 1-3.*

"Dynamic Logic: Beyon The Click: Insights from Advertising Research," vol. 1, No. 1, Jun. 2000, pp. 1-2.*

"SurveyMonkey.com—The easiest way to create online surveys"; <www.surveymonkey.com/Home.asp>, Oct. 23, 2002; 6pgs.*

Ipsos-ASI The Advertising Research Company, *Vendor Background*; Apr. 5, 2000; pp. 1-30.

*New Service Rewards Users For Viewing Wed Ads*, Gale Group Newsletter DB: Jun. 18, 1996.

Dysart, *Interactive the Web's New Standard*, Nov. 1998, pp. 30-36.

International Search Report.

Written Opinion Of The International Searching Authority.

* cited by examiner

METHOD AND SYSTEM FOR CONDUCTING AN ON-LINE SURVEY

CROSS REFERENCE TO RELATED APPLICATION

This application claims priority of Aviv U.S. Provisional Application Ser. No. 60/529,358 filed on Dec. 12, 2003, entitled "Method and System for Conducting an On-Line Survey," the contents of which are incorporated herein by reference in their entirety including the contents and teachings of any references contained therein.

TECHNICAL FIELD

The invention relates generally to on-line advertising and, more particularly, to soliciting computer users to take on-line surveys.

BACKGROUND

Businesses have increasingly discovered that the Internet can be an effective forum for increasing brand awareness. To accomplish this goal, businesses frequently place advertisements on web pages that they believe will be viewed by potential customers. These advertisements can take a variety of forms, including banner ads. A banner ad is a graphic image that advertises a product or service. A banner ad typically contains a link, so that when a user clicks on the ad, the link is activated and he or she is sent to another web page having further information about the product or service being advertised. A banner ad can be displayed within the boundaries of a web page itself, or in a window, commonly referred to as a pop-up window, that is separate from the window in which the user's browser runs. A problem with popup windows is that they are sometimes seen as intrusive, and users often close them as soon as they appear.

Businesses have also discovered that, in addition to being a good advertising forum, the Internet also provides a convenient way to survey consumers in order to determine what impact Internet advertising is having on them. Recruiting users to take surveys can be a challenging task. U.S. Pat. No. 6,070,145, entitled "RESPONDENT SELECTION METHOD FOR NETWORK-BASED SURVEY" proposes a method in which visitors to a web site are randomly chosen to be solicited to take an on-line survey. If a visitor is chosen, then a graphic image soliciting the visitor to take the survey is transmitted from a surveyor to the web site being visited. The image is then displayed to the visitor. If the visitor is not chosen, then a dummy image is displayed.

Another survey method is described in pending U.S. patent application Ser. No. 09/349,650, filed Jul. 8, 1999, entitled "SYSTEM AND METHOD FOR EVALUATING AND/OR MONITORING EFFECTIVENESS OF ON-LINE ADVERTISING." The method described therein involves determining whether a user has been exposed to an on-line ad such as by checking cookies stored on the user's computer. Based, at least in part, on this determination, a decision is made as to whether or not to solicit the user to take an on-line survey.

U.S. patent application Ser. No. 09/349,650, filed Jul. 6, 2001, entitled "Method and System for Conducting An On-Line Survey," describes yet another way to carry out on-line surveys. In that system, in response to receiving a request for a block of data from a user's computer, a determination is made whether the user has previously been solicited to take an on-line survey. Thereafter, computer-readable instructions are returned with the requested block of data that facilitate invoking a procedure for soliciting the user to take an on-line survey.

Collecting data through the use of on-line surveys provides a fast and effective way to determine how well an Internet advertisement is being received. A problem with on-line surveys, however, is that many users are annoyed when solicited to participate in such surveys. This is particularly true when survey solicitations take the form of pop-up windows.

SUMMARY OF THE INVENTION

In accordance with the foregoing, a method and system for launching and presenting an on-line survey is provided. The invention facilitates linking on-line surveys intimately with an on-line advertisement that resulted in launching an invitation to take the on-line survey.

In particular, a method and system for conducting an on-line survey are presented herein. The components of the system cooperatively interact to initially receive a request for a block of data, the requested block of data comprising computer-readable instructions for displaying an on-line advertisement within a first displayed page. The on-line advertisement is thereafter provided to and presented on a user computer. Thereafter, original links on the first displayed page are replaced with links to a page relating to the on-line survey in accordance with a computer-readable instruction contained within the on-line advertisement instructions. An on-line survey sequence is launched by retrieving the page relating to the on-line survey in response to a selection of one of the replaced links on the first displayed page.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF EMBODIMENTS OF THE INVENTION

The invention is generally directed to a method and system for injecting an on-line survey into a user session on the Internet. A new way of recruiting people to take an on-line survey is described that includes a mechanism for tying a survey invitation to an advertisement displayed within an HTML <IFRAME> on a web page. Ordinarily, the <IFRAME> construct limits writing to data constructs within the scope of the <IFRAME>. However, in accordance with an embodiment of the invention, links outside the scope of the <IFRAME> associated with a downloaded advertisement are selectively replaced on the web page, in accordance with a replacement algorithm, by a survey page link associated with the <IFRAME>. When a user selects the replacement link, a survey invitation page is downloaded to the user's computer.

In an embodiment of the invention, many exit points/links are provided on the survey invitation page that enable the user to: take the survey, go back to the original page (with the original links present), or proceed to the page associated with the originally selected link (that was replaced by the survey page link). The disclosed survey invitation mechanism/method enables a survey provider to invite people to take a survey only if they were exposed to the advertisement associated with the <IFRAME>. The link replacement mode of re-directing a user to a survey invitation avoids opening a new window (e.g., a pop-up) to display the survey invitation. Providing multiple links to potentially desired alternative pages (e.g., the original page, the page associated with the selected link, etc.) reduces the impression of having a user session taken over by unwanted advertisements/surveys.

Figure 1:
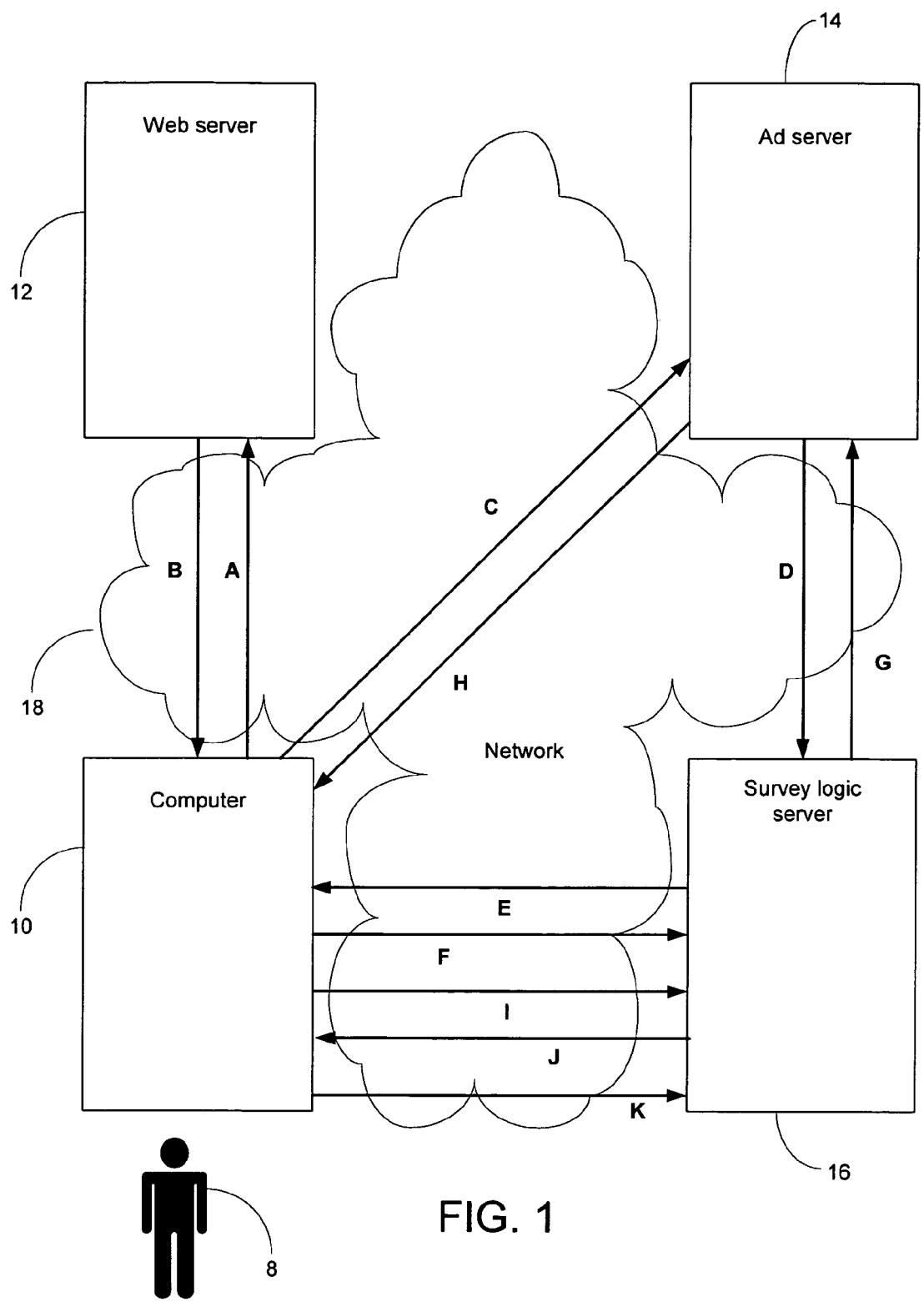
FIG. 1 is a block diagram generally illustrating an example network environment in which an embodiment of the invention is used.

An example of a network environment in which an embodiment of the invention is implemented is shown in FIG. 1. The network environment includes a computer 10 associated with a user 8, a web server 12 for delivering web pages, an ad server 14 for delivering on-line advertisement, and a survey logic server 16 for determining if and when to solicit users to take on-line surveys. Each of the components 10, 12, 14 and 16 is communicatively linked to a computer network 18. The components 10, 12, 14 and 16 send computer-readable instructions to one another, including source code that is interpreted by various program. Types of source code that are sent among the components 10, 12, 14 and 16 include, but are not limited to: script, such as JavaScript, and mark-up language code, such as Hypertext Mark-up Language (HTML) and Extensible Mark-up Language (XML). The term "code" is used herein to connote both executable and source code.

Example implementations of the computer network 18 include a public network, such as the Internet, a private network, such as a virtual private network, or a combination thereof. In various embodiments of the invention, the computer network 18 is made up of scores of smaller networks many of which act as intermediate points in the communication among the components, 10, 12, 14 and 16. More detail concerning an implementation of the components 10, 12, 14 and 16 will be given following an overview of how an embodiment of the invention operates.

Referring again to FIG. 1, the basic operation of an example embodiment of the invention will now be described. The arrows A-K each represent the transmission of data between one or more of the components 10, 12, 14 and 16 over the network 18. The example operation starts when the user 8 operates the computer 10, logs onto the network 18 and requests a web page from the web server 12 (arrow A). The web server 12 sends the web page in the form of a mark-up language document, such as an HTML document, to the computer 10 (arrow B). In this example, the web page sent by the web server 12 is configured to display an on-line advertisement, such as a banner ad. The mark-up language document sent by the web server 12 to the computer 10 at arrow B includes a reference, such as an HTML "HREF," to data maintained by the ad server 14. The data includes computer-readable instructions for displaying the advertisement. Possible formats for the data include an image file, a script language file, or some combination thereof.

When the computer 10 reads the mark-up language document received from the web server 12, it interprets the above-mentioned reference and sends a request for the data to the ad server 14 (arrow C). The ad server 14 then contacts the survey logic server 16 to request that the survey logic server 16 determine whether to consider soliciting the user 8 to take an on-line survey (arrow D). In making the request, the ad server 14 passes the IP address of the computer 10 to the survey logic server 16. The survey logic server 16 contacts the computer 10 to request that the computer 10 send cookie data, if there is any, regarding previous on-line survey solicitations (arrow E). The cookie data includes those pieces of information that are stored in cookie files by the computer 10. The computer 10 responds to the request by sending the cookie data, if it exists, or by sending a negative reply it has no such cookie data (arrow F).

The survey logic server 16 analyzes the response received from the computer 10 to determine whether the user 8 has recently been solicited, if at all, to take the on-line survey. If the response indicates that the user 8 has been recently solicited, the procedure ends. If the response indicates that the user 8 has not been previously solicited (e.g. no cookie data was returned), or if the response indicates that there has been a sufficient amount of time since the last solicitation (e.g. the cookie data has a timestamp that is more than one hour old), then survey logic server 16 sends a script to the ad server 14 (arrow G). This script contains instructions for calling a decision routine on the survey logic server 16. The ad server 14 combines the script with the advertisement data that was requested by the computer 10 at arrow C and sends the combined data to the computer 10 (arrow H). In one implementation, the advertisement data is, itself, a script, which the ad server 14 modifies to include the script provided by the survey logic server 16. When the computer 10 receives the combined data from the ad server 14, it displays the advertisement and runs the script provided by the survey logic server 16. In accordance with the instructions contained in the additional script, the computer 10 generates a random number, and makes a call to the survey logic server 16 (arrow I). This call includes the random number as part of the Uniform Resource Locator (URL) to which the call is directed. The random number acts as an input to the decision routine executed at the survey logic server 16.

The survey logic server 16 then references a frequency parameter to determine whether or not to solicit the user 8 to take the on-line survey. The value of the frequency parameter expresses the probability that any given user will be solicited to take the on-line survey. The value is obtained by an algorithm or a look-up table and is expressed as a number that connotes a range. For example, a frequency of 20% connotes a range between 0 and 20 on a 100 point scale and indicates that any given user will have a 20% chance of being solicited to take the on-line survey. The survey logic server 16 compares the random number with the range. If the random number falls outside of the range, then the user 8 is not solicited. For example, if the value of the frequency parameter is 20% and the random number is 30 (i.e. outside of the range of numbers from 0 to 20), then the survey logic server returns a blank space to the computer 10. If the random number falls within the range, then the survey logic server 16 transmits script for soliciting the user 8 to the computer 10 (arrow J). The computer 10 then executes the script to run a solicitation procedure. Example implementations for the solicitation procedure include displaying a pop-up window to the user 8 requesting that the user click on a link to a web page that has the on-line survey. If the user clicks on the link, the computer 10 requests the web page from the survey logic server 16 (arrow K).

Although FIG. 1 and the accompanying description show an example of the flow of information that occurs in an embodiment of the invention, there are many other possible routes for sending the information. According to one implementation, the computer 10 requests the advertisement data from the web server 12 instead of directly from the ad server 14 (see arrow C). The web server 12 then relays the request to the ad server 14. In another implementation, the survey logic server 16 communicates with the computer 10 indirectly through the ad server 14 and/or the web server 12. In yet another implementation, the computer 10 has no knowledge that the advertisement data is being provided by a third party, and simply requests a web page from the web server 12, which pulls the advertisement data from the ad server 14 and inserts it into the web page before or during delivery of the web page to the computer 10. In still another implementation, the web server 12 and the ad server 14 are co-located as part of a single local area network.

Figure 2:
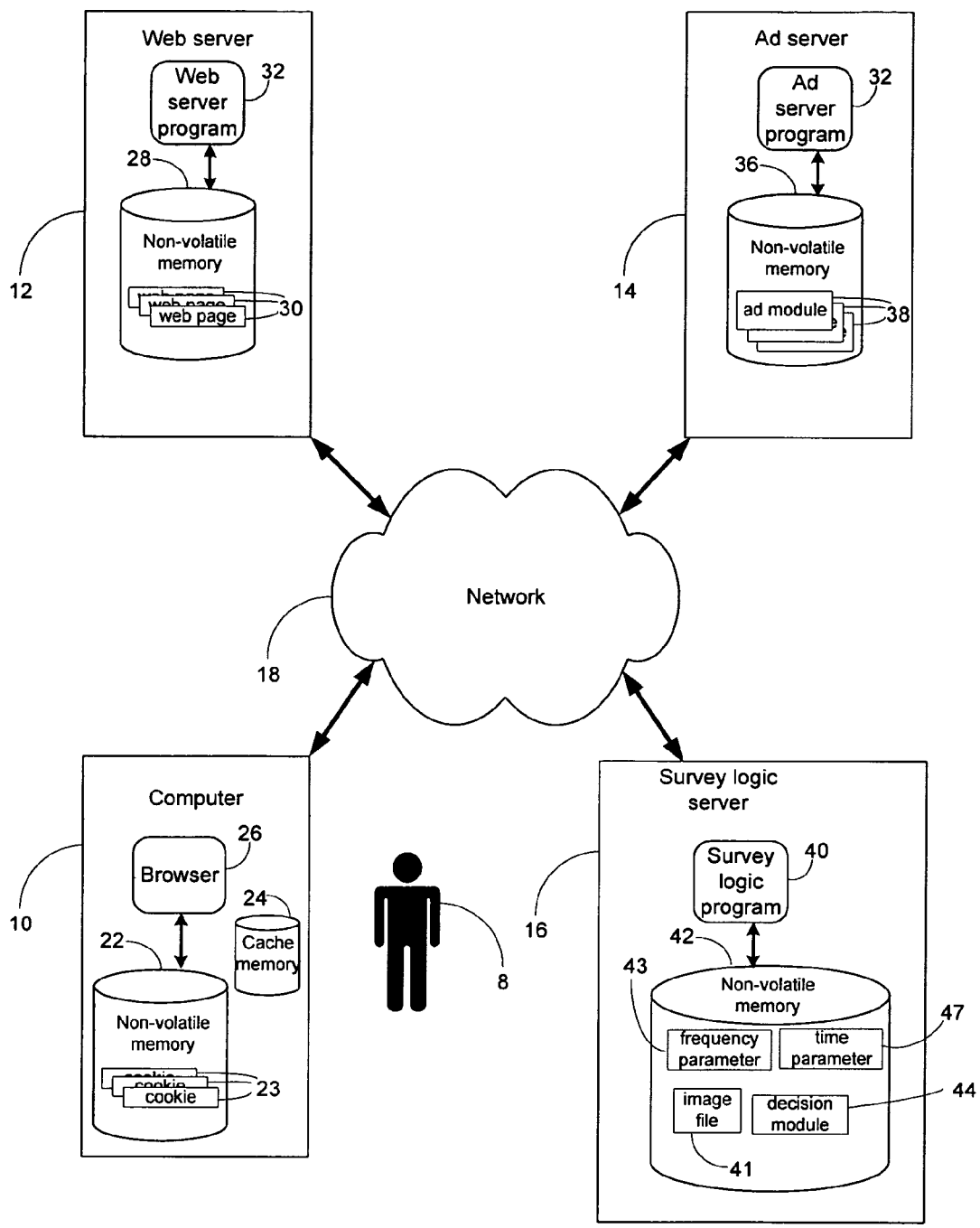
FIG. 2 is a block diagram that shows a more specific embodiment of the components of FIG. 1.

Referring to FIG. 2, a more specific implementation of the components 10, 12, 14 and 16 from FIG. 1 will now be described. The computer 10 includes a non-volatile memory 22 and a cache memory 24. The cache memory 24 temporarily stores data for quick access. The non-volatile memory 22 has stored therein history files or cookies 23 containing data representing, for example, what web sites the user 8 has visited or what data he/she has submitted at those webs sites using the computer 10. The computer 10 executes a browser program 26 for downloading and reading documents from the network 18, such as documents written in Hypertext Mark-up Language (HTML) and Extensible Mark-up Language (XML). The browser 26 also downloads and runs various scripts from the network 18, such as those written in JavaScript.

The web server 12 has a non-volatile memory 28 having stored therein web pages 30. Each web page 30 is a document written in a language such as HTML or XML that may include one or more scripts as well. The web server 12 executes a web server program 32 for delivering web pages to computers that request them over the network 18. The ad server 36 includes a non-volatile memory 36 having stored therein ad modules 38. Each ad module 38 contains code for displaying an on-line advertisement, such as a banner ad. The ad modules 38 include routines written in one or more languages that are understandable by various browsers, such as JavaScript or compiled Java applet. The ad server 14 executes an ad server program 34, which transmits one or more of the ad modules 38 over the network 18 to computers that request them.

According to an embodiment of the invention, at least some of the ad modules 38 further include code for calling functions of the survey logic server 16. To obtain the services of the survey logic server 16, for example, the administrators of the ad server 14 go to a web site associated with the survey logic server 16, copy the appropriate source code (e.g. HTML code or JavaScript) for invoking functions of the survey logic server 16, and paste the source code into the ad modules 38 for which on-line surveys are desired.

The survey logic server 16 includes a non-volatile memory 42 having stored therein a survey decision module 44. The survey decision module 44 includes code for deciding whether or not to solicit a computer user to take an on-line survey. Example implementations of the survey decision module 44 include a block of server-side script, such as CGI or PHP. The survey logic server 16 executes a survey logic program 40. The survey logic program 40 communicates with computers over the network 18 to conduct on-line surveys. The non-volatile memory 42 also has stored therein an image file 41 containing a dummy image.

Also stored in the non-volatile memory 42 are a frequency parameter 43 and a time parameter 47. The frequency parameter 43 dictates how often users are to be solicited for an on-line survey. For example, if F=0.2, then 20 out of every 100 users will be solicited. The time parameter 47, on the other hand, dictates how often users are allowed to be solicited for on-line surveys. For example, if the time parameter is equal to one hour, then a user won't be solicited for an on-line survey more often than once per hour.

According to an embodiment of the invention, the level of the frequency parameter can be changed throughout a survey campaign. In one embodiment, the frequency parameter 43 is set low at the beginning of the campaign and increased towards 1.0 near the end of the campaign. This allows the creators of the survey to get a few data points at the beginning of the campaign and, if necessary, change the questions. In one implementation, the value of the frequency parameter changes according to an algorithm that takes into account factors such as how many users have been surveyed, and how much time has elapsed in the survey campaign. In another implementation, the frequency parameter changes according to a look-up table correlating values of time elapsed in a campaign with values for the frequency.

Figure 3:
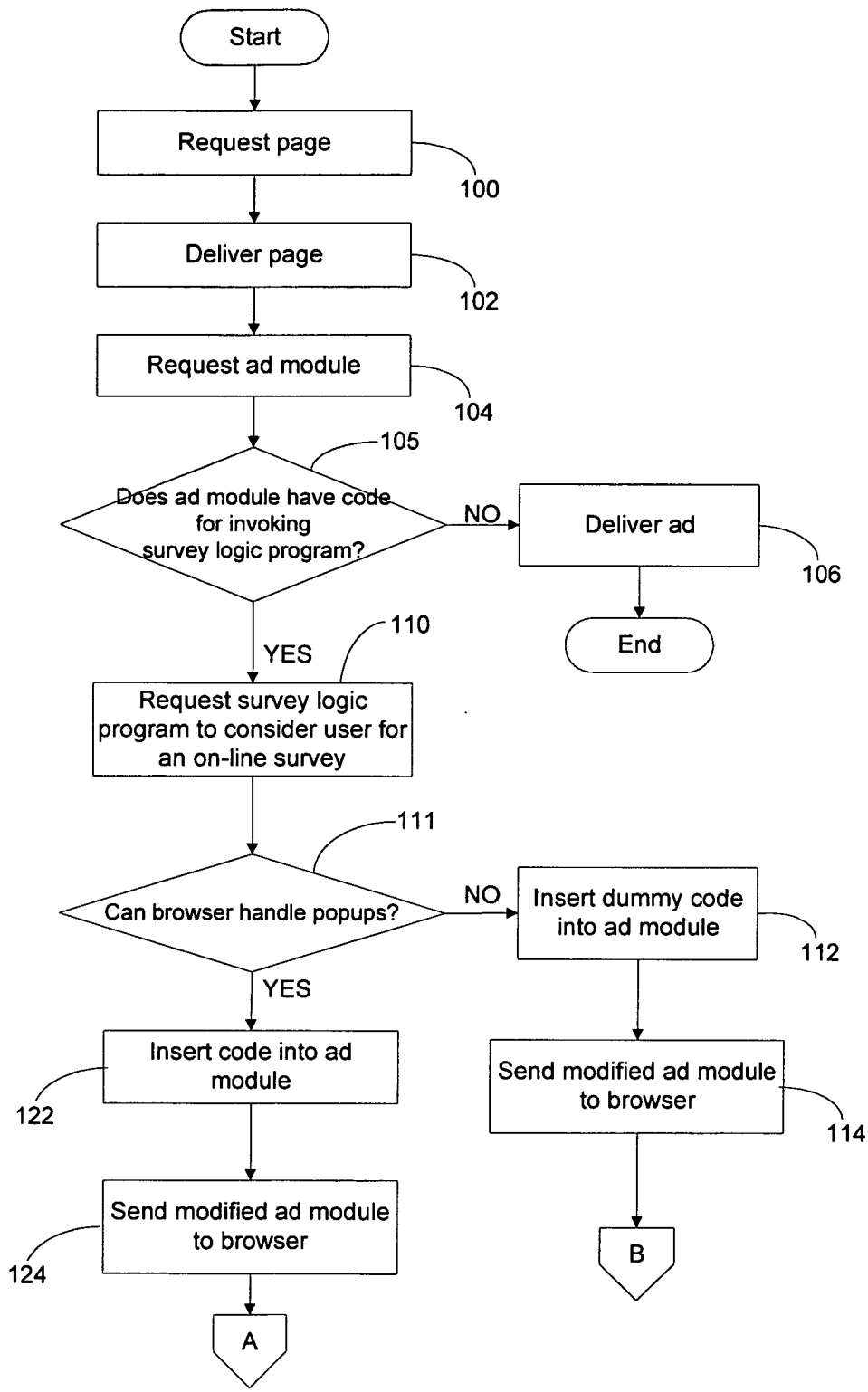
FIGS. 3-5 are a flowchart illustrating steps taken according to an embodiment of the invention.
Figure 4:
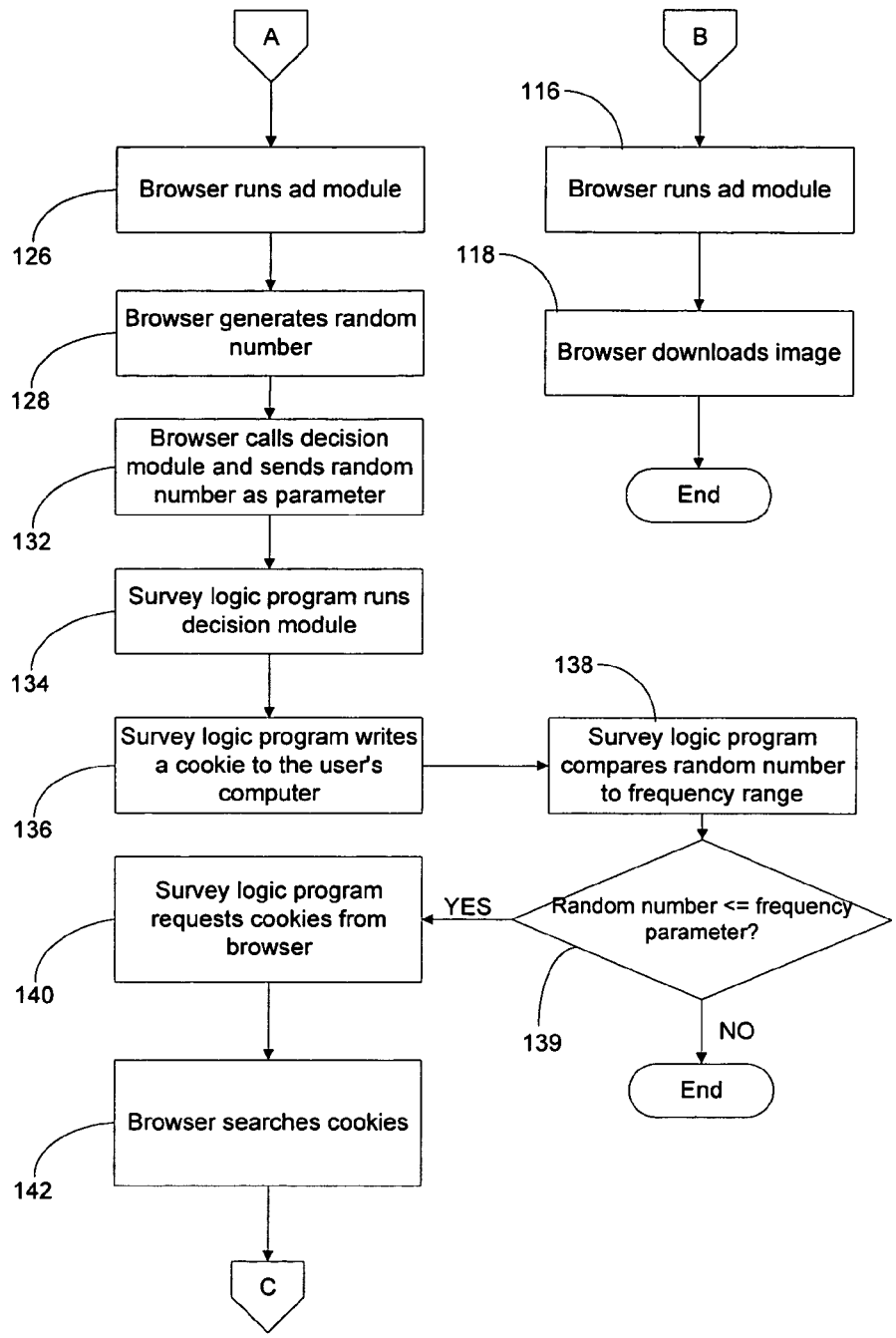
Figure 5:
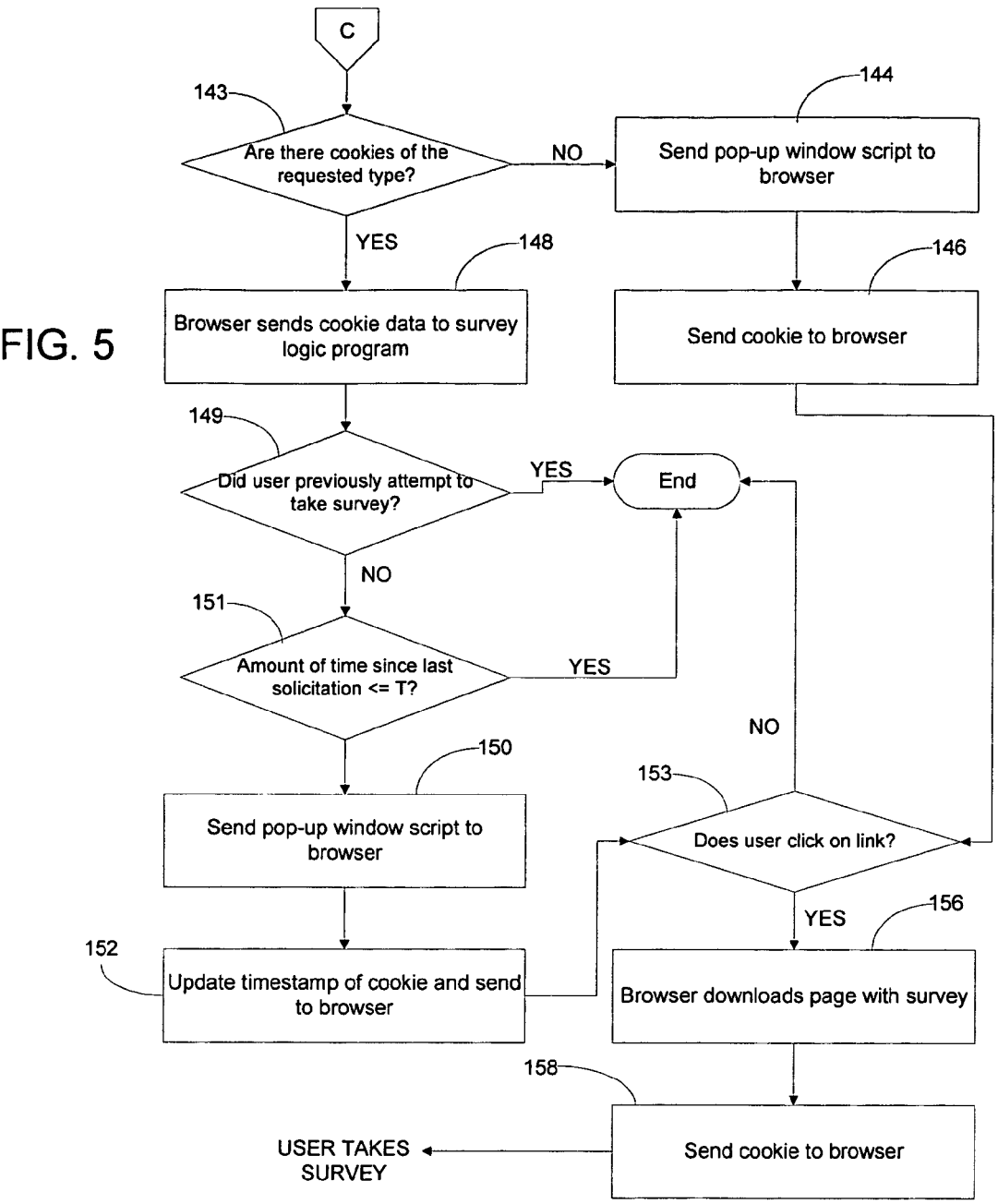

Referring to FIG. 2 as well as to the flowchart of FIGS. 3-5, an example of how an embodiment of the invention conducts on-line survey will now be described. At step 100, the process starts when the user 8 requests a web page from the web server program 32 using the browser 26. During step 102, the web server program 32 delivers the requested web page as an HTML document to the browser 26. While processing the HTML document, the browser 26 encounters a reference to one of the ad modules 38. Next, during step 104, the browser program 26 requests the referenced ad modules 38 from the ad server program 34. At step 105, if the requested ad module does not include code for invoking the survey logic program 40, then control passes to step 106, wherein the ad server program 34 treats the requested ad module 38 conventionally, and delivers it to the browser program 26 without modification, and the process ends. If the requested ad module does include the code, then control passes from step 105 to step 110, wherein the ad server program 34 transmits a request to have the user 8 be considered for an on-line survey to the survey logic program 40. This request includes Hypertext Transfer Protocol (HTTP) header information that was generated by the computer 10 and relayed by the ad server program 34. From this relayed header information, the survey logic program 40 obtains the IP address of the computer 10 and the browser type of the browser 26.

The survey logic program 40 responds by using the browser type information to determine whether the browser 26 can handle pop-up windows. At step 111, if the browser 26 can handle pop-up windows, then control passes to step 122. If not, then the control passes to step 112. In either case, the survey logic program 40 sends HTML source code to the ad server program 34. The ad server program inserts this additional HTML source code into the ad module requested by the browser 26. The content of the additional source code depends on whether the survey logic program 40 determines that the browser 26 can handle pop-up windows. If, at step 111, the browser 26 cannot handle pop-up windows, then control passes to step 112, wherein the survey logic program 40 sends dummy HTML code to the ad server program 34, such as a reference to a dummy image file, which the ad server program 34 inserts into the requested ad module. Next, at step 114, the ad server program 34 sends the modified ad module to the browser 26. At steps 116 and 118, depicted in FIG. 4, the browser 26 runs the modified ad module and downloads the dummy image file 41 (a 1×1 GIF, for example). The procedure then ends.

If, at step 111, the browser 26 can handle a popup, then control passes to step 122, wherein the survey logic program 40 sends to the ad server program source code for: (a) generating a random number, (b) passing the random number to the survey logic program 40, and (c) invoking the decision script 44, and wherein the ad server program 34 inserts the source code into the requested ad module. Control then passes to step 124, wherein the ad server program 34 sends the modified ad module to the browser 26. At step 126, the browser 26 runs the modified ad code. At step 128 the browser 26 generates the random number. At step 132, the browser sends the random number to the survey logic program 44 as part of a call to the decision module 44.

In an embodiment of the invention, the browser 26 includes the random number as part of the URL when making subsequent calls to the survey logic program 40. This helps to ensure that the browser 26 obtains a fresh copy of documents that it requests from the survey logic program 40, rather than pulling them from its cache memory 24. As long as the cache memory 24 perceives the source URL of a requested document to be unique from the source URL of documents that are stored in the cache memory 24, then it will fetch the document from the survey logic program 40. Intentionally defeating a cache memory is frequently referred to in the art as "cache busting."

At step 134, the survey logic program 40 executes the code in the decision module 144. The survey logic program 40 then performs the steps 136-140 according to the code in the decision module 44. During step 136, it sends a cookie to the browser 26. The cookie indicates that the user 8 has been exposed to the advertisement displayed by the ad module 38 that the browser 26 runs. Thereafter, during step 138, the survey logic program 40 compares the random number generated in step 130 to the frequency parameter. At step 139, if the random number falls outside of the numerical range represented by the frequency parameter, then the process proceeds to the End. Otherwise, control passes to step 140, wherein the survey logic program 40 sends a request for cookie data corresponding to the on-line survey to the browser 26. Specifically, the survey logic program asks whether the browser 26 has a cookie that indicates that the user was previously solicited to take the on-line survey, and whether it has a cookie indicating that the user accepted the offer to take a survey. During step 142, the browser 26 searches the cookies 23. Next, at step 143, if the browser 26 finds no cookies that correspond to the on-line survey, it sends a negative response to the survey logic program 40, and the survey logic program 40 proceeds to step 144, wherein it sends JavaScript to the browser 26 that, when executed, causes a pop-up window to appear at the computer 10, which solicits the user 8 to participate in the on-line survey. The pop-up includes a link to a web site at the survey logic server 16 that has the on-line survey. Control then proceeds to step 146, wherein the survey logic program 40 sends a cookie to the browser 26 to indicate that the user 8 has been solicited.

At step 143, if the browser 26 finds cookies corresponding to the on-line survey, then control passes to step 148 wherein it sends the data contained in the cookies to the survey logic program 40. The survey logic program then examines the cookie data. At step 149, if the cookie data indicates that user 8 actually accepted a previous attempt to take a survey, then the process passes to the End. Likewise, if, at step 151, the cookie data indicates that the amount of time elapsed since the user was last solicited to take the on-line survey is less than a time parameter T, the process passes to the End. Otherwise, the flow proceeds to step 150, wherein the survey logic program 40 sends JavaScript to the browser 26 that, when executed, causes a pop-up window to appear at the computer 10, which solicits the user 8 to participate in the on-line survey. The pop-up includes a link to a web site at the survey logic server that has the on-line survey. Control then proceeds to step 152, wherein the survey logic program 40 sends an updated timestamp to the browser 26 to indicate that the user 8 has been solicited. The browser updates the timestamp of the appropriate cookie.

At step 153, if the user does not click on the link in the pop-up window prior to the expiration of a timeout period, or if the user dismisses the popup, the process ends. Otherwise, if the user clicks on the link in the pop-up window, then control passes to step 156, wherein the browser automatically downloads a web page containing the survey from the survey logic program 40. Next, at step 158, the survey logic program 40 then sends a cookie to the browser 26 to indicate, for future reference, that the user has taken the on-line survey. The user may then take the on-line survey.

According to an optional feature of the invention, the code for calling routines in the survey logic server 16 (FIG. 2) is included in an ad module that is NOT subject of the survey in order to solicit "control" subjects. More specifically, some on-line survey campaigns conducted in accordance with the invention are designed to recruit both "exposed" subjects (those who are more likely to have been exposed to the brand that is the subject of the survey) and "control" subjects (those who are less likely to have been exposed to the brand). Exposed subjects are identified in a variety of ways. For example, exposed subjects are identified by checking a user's computer to see if its non-volatile memory has a cookie indicating that an advertisement for the brand has been shown. If a user's computer has a cookie indicating that the advertisement was displayed on the user's computer, then the user is classified as exposed, while the absence of such a cookie classifies the user as control. Also, the selection of which banner ads will have code for invoking the survey logic server 16 helps to distinguish exposed participants from control participants. For example, if the purpose of the on-line survey is to determine the impact of the FORD brand on automobile owners, then code for invoking routines on the survey logic server 16 is placed in FORD banner ads to recruit exposed participants and in some other banner ad—a 20TH CENTURY real estate company ad, for example—to recruit control participants. According to an embodiment of the invention, if the ad module that is being modified by script from the survey logic server 16 (FIG. 2) carries a brand that is the subject of the survey campaign, the pop-up window code sent from the survey logic server 16 to the computer 10 is triggered when the user leaves the page (e.g. using the JavaScript "onUnload" command) to ensure that the user 8 has the opportunity to view the banner ad. Conversely, if the banner ad carries a brand that is not the subject of the survey, then the solicitation sent from the survey logic server 16 is triggered as soon as it reaches the browser 26 (e.g., using the JavaScript "onLoad" command).

Having described a pop-up based method and system for introducing on-line surveys, attention is now directed to an alternative to the pop-up window approach for inviting a user of the computer 10 to take an on-line survey associated with an advertisement provided by the ad server 14 and executed within the confines of a well known HTML <IFRAME> construct within a web page. In the illustrative embodiment, executable instructions (e.g., scripts) provided in the advertisement downloaded by the ad server 14, including special instructions for invoking replacement of links on a web page containing the advertisement, are executed by the computer 10. As a consequence of executing the instructions, the computer 10 sends a notification to a web server (such as Web server 12) that initiates replacing links on the web page, associated with graphical user interface elements residing outside a box associated with the advertisement's HTML IFRAME construct, by a link to a survey invitation page when the advertisement code/instructions are executed upon a user's computer. The steps of this process are described in detail herein below.

Figure 6:
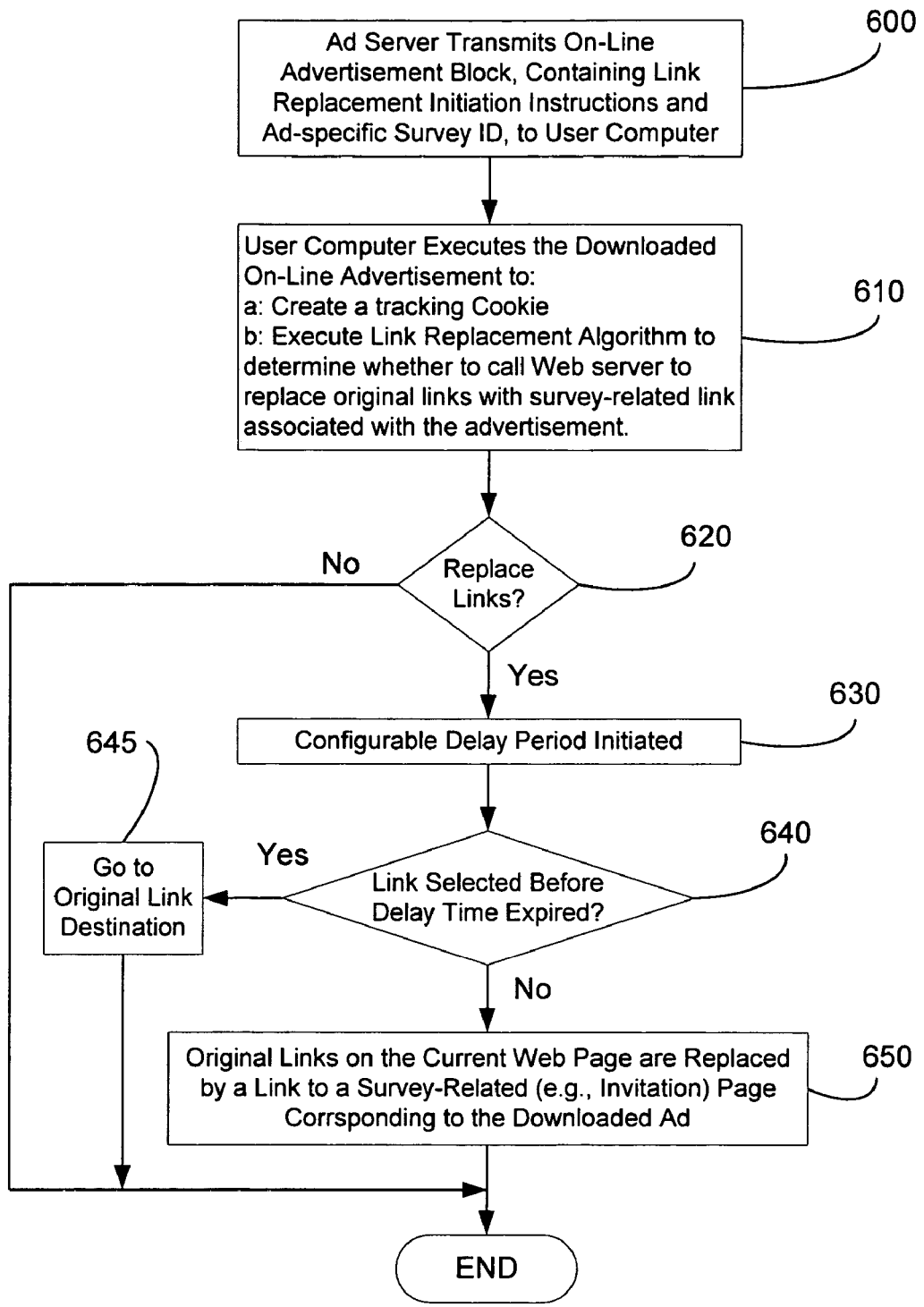
FIG. 6 is a flowchart summarizing steps for replacing original links on a web page with a link to a survey invitation page in accordance with an exemplary embodiment of the present invention.

With reference to FIG. 6, the following general steps are performed in this new method for injecting and carrying out on-line surveys in a manner considerably less obtrusive than pop-up windows Initially, during step 600 an advertisement (ad) block is downloaded by the ad server 14 to the computer 10. The advertisement block provided by the ad server 14 includes, by way of example, a tag (one line of html javascript such as /dynamiclogic/dynamiclink.html?param=3323414). The tag is specific to the campaign and creative it is included in. Thus param=3323414 identifies a particular survey page link. A number of additional switches are contemplated to tailor implementation of link replacement on web pages. The ad block is, by way of example, downloaded from the advertisement server 14 to a browser running on the computer 10 via a call from an html <IFRAME> tag that designates a rectangle on a current web page within which the advertisement will be presented.

Thereafter, during step 610 the computer 10 executes the advertisement code downloaded during step 600. The included code within the ad carries out the following functions:
  a. Writing a "tracking cookie" in the user's computer, including the right creative code.
  b. Carrying out a decision mechanism described below for determining whether to replace links on the web page containing the <IFRAME> with links to an invitation to take a survey corresponding to the downloaded advertisement. Depending on the outcome of the decision mechanism's algorithm and current values of relevant status variables, all, or a portion, of the links on the page are changed through instructions rendered by the web server 12 (or any other entity permitted to write to affected portions of the previously downloaded web page containing the advertisement <IFRAME> tag) to point to a designated on-line survey web page.

Next, at step 620, the advertisement code decision mechanism described above determines whether to replace originally provided links in the downloaded web-page with a link associated with the designated on-line survey web page. If the decision is made to NOT change the links, then control passes to the END without replacing any links on the current web page. Otherwise, if the decision has been made to change the links, then control passes to step 630 wherein a pre-configured delay of "x" seconds commences and runs until either the end of the delay period or the user clicks on a link on the downloaded web page. Control passes to step 640 upon: (1) a user selecting a link, or (2) expiration of the delay period.

At step 640, if the user clicked on a link on the web page before the delay period expired, then control passes to step 645 wherein a new web page associated with the link is downloaded to the browser on the user computer 10, and the link replacement process ends (illustratively shown by connecting step 645 to the End) without replacing any links on the web page with a survey link.

However, if the delay period expires before the user selects a link on the current web page, then control passes from step 640 to step 650 (the link replacement process continues). Thus, the actual link changes are carried out on the original web page after "x" seconds have passed (x can be configured). The delay period prevents executing the link replacement in the cases where users reference the originally loaded web page knowing of a particular link that they wish to select, and the users click the link immediately after the web page is presented by the browser.

At step 650 original links on the current web page are replaced by a link to a survey-related (e.g., invitation) page corresponding to the advertisement downloaded during step 600. In particular, the browser on the computer 10 issues a request, in accordance with the advertisement instructions (downloaded in the ad block during step 600), to the web server 12 that specifies a unique code associated with a particular survey-related link that is to replace a set of original links on the currently loaded web page. Upon receiving the link replacement request the web server refreshes/replaces the set of original links on the web page to point to the specified survey-related (e.g., invitation) web page. This marks the end of the process for replacing the links on the downloaded web page with a link to a survey page in accordance with execution of scripts contained within the downloaded advertisement block associated with an <IFRAME> contained therein.

Before describing the post link replacement behavior of the modified downloaded web page, an exemplary embodiment of the link replacement operation itself will be described. In the exemplary embodiment the downloaded advertisement, which initiates the link replacement, is provided in an <IFRAME> construct. During step 650 an HTML tag downloaded with the advertisement code during step 600 initiates updating the current web page's links through a series of write instructions on the web page. A JavaScript "document.write" statement generally invokes over-writing/replacing contents of a previously downloaded web page. Thus, in the current example, a document, write statement invokes replacing an original link with a modified (survey invitation page) link within the previously downloaded web page.

However, the <IFRAME> construct, with which the downloaded advertisement code is associated, generally prevents the advertisement code (downloaded during step 600) from modifying the original links on the web page that reside outside a portion of the web page allocated to the downloaded advertisement's IFRAME. In particular, document, write requests coming directly from the downloaded advertisement scripts specify the domain name of the downloaded advertisement's source—which is generally not the domain name of the web page where original links need to be overwritten. The <IFRAME> construct, that limits access to a specified portion of a web page based upon a domain name associated with a request, therefore prevents the advertisement code from directly requesting replacement of links residing outside the space on the web page allocated to the downloaded advertisement.

To overcome the limitations imposed by the <IFRAME> construct, in an exemplary embodiment a specially identified file (e.g., "dynamiclink.html") is installed within the web server 12 under a document root directory of a domain (e.g., "yahoo.com") to which the originally downloaded web page containing replaceable links belongs (e.g., above the downloaded web page in a hierarchical directory structure to which the web page belongs). This ensures that the scope of the replacement (e.g., document, write) instructions, issued by the web server 12 upon request from the downloaded advertisement, is at least as great as the downloaded web page within which link replacement is to occur.

In an embodiment of the invention, the code in the specially identified file is written in a flexible (generic) way, so that it is the same for any domain name on the web, and so that it need not be updated for new software releases. By way of example, the "dynamiclink.html" file on the web server 12 contains a number of configurable points that are driven by parameters passed within a tag/request, from the downloaded advertisement code, that invokes the link replacement operation on the downloaded web page. Thus, the document, write instructions in the generic file are completed based upon advertisement instance-specific parameters passed by the computer 10 to the Web server 12 (that provided the original web page containing the advertisement).

It is noted that the above-described steps and their order of execution are merely exemplary. As such, the order of executing the tests and delays is modified in accordance with alternative embodiments. For example, in one alternative embodiment, the delay period must be exceeded before the link replacement algorithm is applied (step 620). Thus, in an alternative embodiment of the invention, if the user selects a link before the delay period ends, then the replacement algorithm is never executed with regard to that particular instance.

Figure 7:
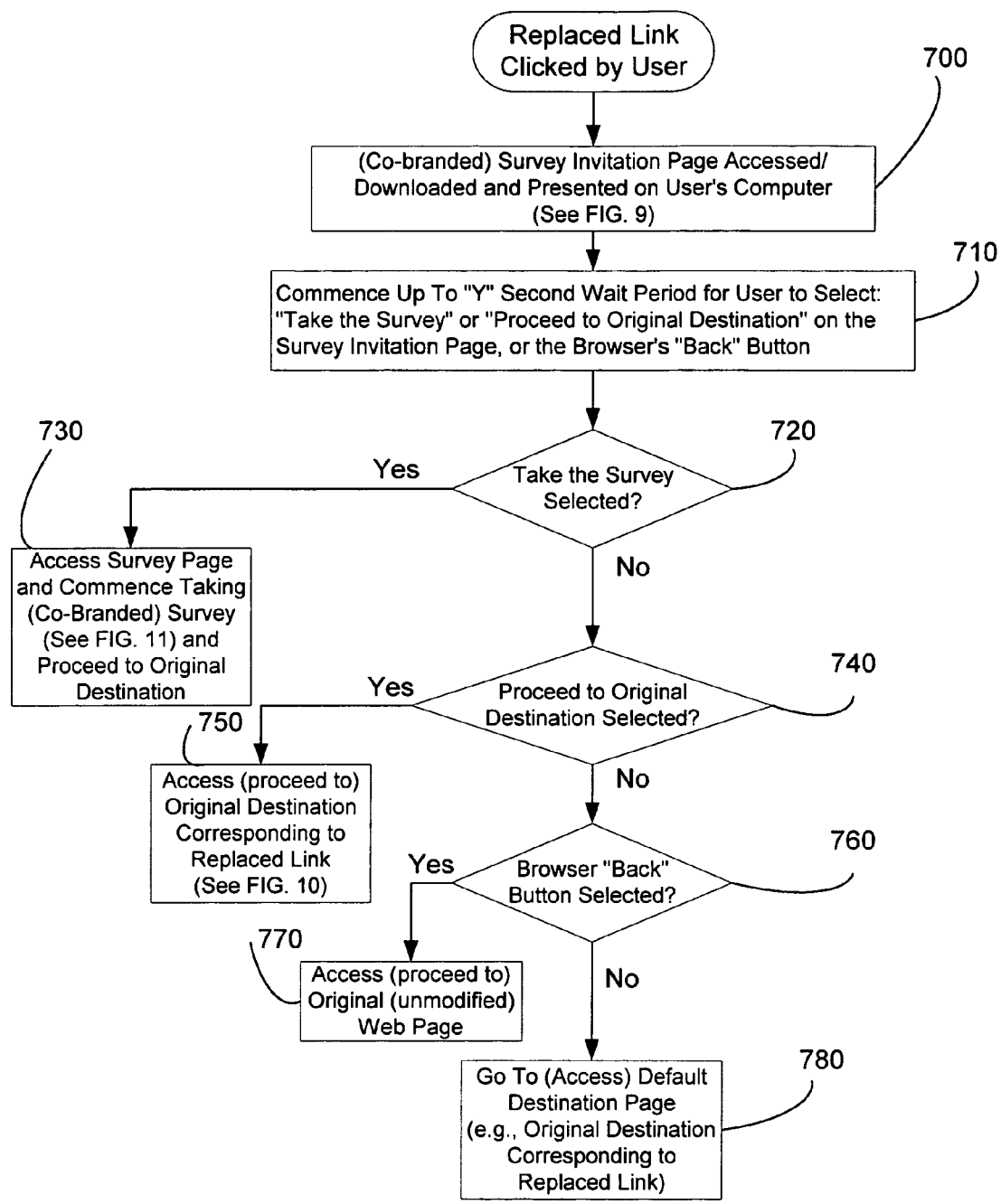
FIG. 7 is a flowchart summarizing steps for providing a survey invitation with options presented to by-pass the survey if a user desires to proceed to a page corresponding to a replaced original link.

Continuing with the description of the illustrative method for presenting advertisement-related surveys to users, attention is directed to FIG. 7 that describes operations/steps performed after the links on a page have been replaced by a link to a survey invitation page. Assuming that the user delays long enough to allow the original links to be replaced by the link to the survey-related page (during previously described step 650), upon receiving notification that the user has clicked any instance of the replacement link on the modified web page, at step 700 the user computer 10 accesses, and a user is presented, a survey invitation page. When the request to access the survey page is issued, the original link that was replaced by the survey page link during step 650 is also passed (to facilitate proceeding to the originally assigned web page from the survey invitation page and/or the survey itself).

When the initial survey invitation page is displayed (see, FIG. 9) it provides the user an option (e.g., a GUI button) to proceed to a survey web page or continue on to a web page corresponding to the original (replaced) link. Furthermore, the survey invitation page is optionally "co-branded" to create an impression that the survey page, displayed in place of the originally intended web-page/destination, is at least associated with the page/site from which the survey invitation page was launched—so that a user is made to believe that the original website has not been departed, thereby alleviating a potential concern by a user that the user's web browser has been hi-jacked.

Continuing the description of the steps summarized in FIG. 7, at step 710 a period commences wherein the system waits up to "y" seconds for a user to select one of the links on the modified web page. The wait period of "y" seconds is configurable. The wait step 710 exits, by way of example, when either the wait period ends or a user makes one of three different available selections: (1) take the survey, (2) proceed to the originally intended destination web page (corresponding to the original/replaced link on the previously presented web page), or (3) go "back" to the previously presented web page (by selecting the browser's back button). At step 720, if the user clicked the "take the survey" page, then control passes to step 730 and the survey page is accessed. The original link that was replaced by the survey invitation page link, is passed within the survey page request to facilitate enabling the user to proceed to the original destination from the survey page. Furthermore, a parameter identifying the original web page from which the survey was accessed is passed to facilitate co-branding the survey page(s).

During step 730 the survey page (see, e.g., FIG. 11) is downloaded and presented by the browser on the computer 10. The survey page(s) utilize(s) the passed parameters to facilitate co-branding survey pages and provide a link for the user to quit the survey and proceed to the page associated with the original/replaced link on the web page from which the survey invitation was accessed. Selecting the back button from the survey page takes the user back to the original page where the advertisement was initially presented. Furthermore, after the back option is selected during the survey, the regular links are enabled on the original page. Thus, subsequent link selections on the previously altered web page will not display the survey invitation again. Upon completing the survey, instructions are executed within the survey page to access the destination page corresponding to the original/replaced link thereby completing the survey sequence.

If the user did not select the "Take the Survey" option, then control passes from step 720 to step 740. At step 740, if the user chose the "Proceed to Original Destination" option, then control passes from step 740 to step 750 and the original destination page is accessed using the original/replaced link passed by the browser when the survey page was initially requested during step 700 (see, FIG. 10).

If the user did not select the "Proceed to Original Destination" option, then control passes from step 740 to step 760. At step 760, if the user chose the "back" button on the browser while the survey invitation was displayed, then control passes to step 770 wherein the original page, where the advertisement was initially downloaded and presented, is accessed by the browser. As mentioned above, the regular links are enabled on the original page. Thus, subsequent link selections on the previously altered original web page will not display the survey invitation again.

Finally, if the user does not click either button (to take the survey or to continue to the requested destination) or select the back button, then control passes from step 760 to step 780, and a default web page is accessed. By way of example, the user is taken to the requested original destination web page, corresponding to the original/replaced link, if no selection has been made upon expiration of the "y" (configurable) second delay period.

It is noted that the above-described link-replacement procedure for initiating the launch of a survey associated with a particular advertisement on a web page is highly flexible. The following comprise examples of configurable parameters driving the operation of the link replacement functionality:

Number of seconds before changing the links;

Number of seconds for the survey invitation page to stay up until automatic transfer to the requested destination takes place;

Image to be displayed at the top of survey invitation and pages, for the co-branded look;

Minimum time to wait between invitations (so that a user does not get too many); and Frequency of changing links (so that recruitment happens at a controlled pace).

Furthermore, the link replacement software maintained within the special file on the web server can be configured, via passed "filter" parameters to suppress the link change mechanism on web pages containing certain key words (like "privacy policy", or "contact us").

Those skilled in the art will thus appreciate that the above-described embodiment is intended to be exemplary and a number of variations in the described examples are contemplated in accordance with alternative embodiments of the invention.

The following is an exemplary decision mechanism executed during step 610(*b*) identified above. In an embodiment of the present invention, the decision whether to perform link replacement within a web page is based on:

- The frequency by which users are invited to take an on-line survey (this frequency can be changed during a campaign to optimize recruitment);
- The last time the specific user was presented with an offer to take the survey (the time difference between invitations can be defined in consultation with the specific site);
- If the user has started a survey before, the user will not be invited again (even if the user did not complete the survey); and
- People who do not allow cookies will not be invited.

Figure 8:
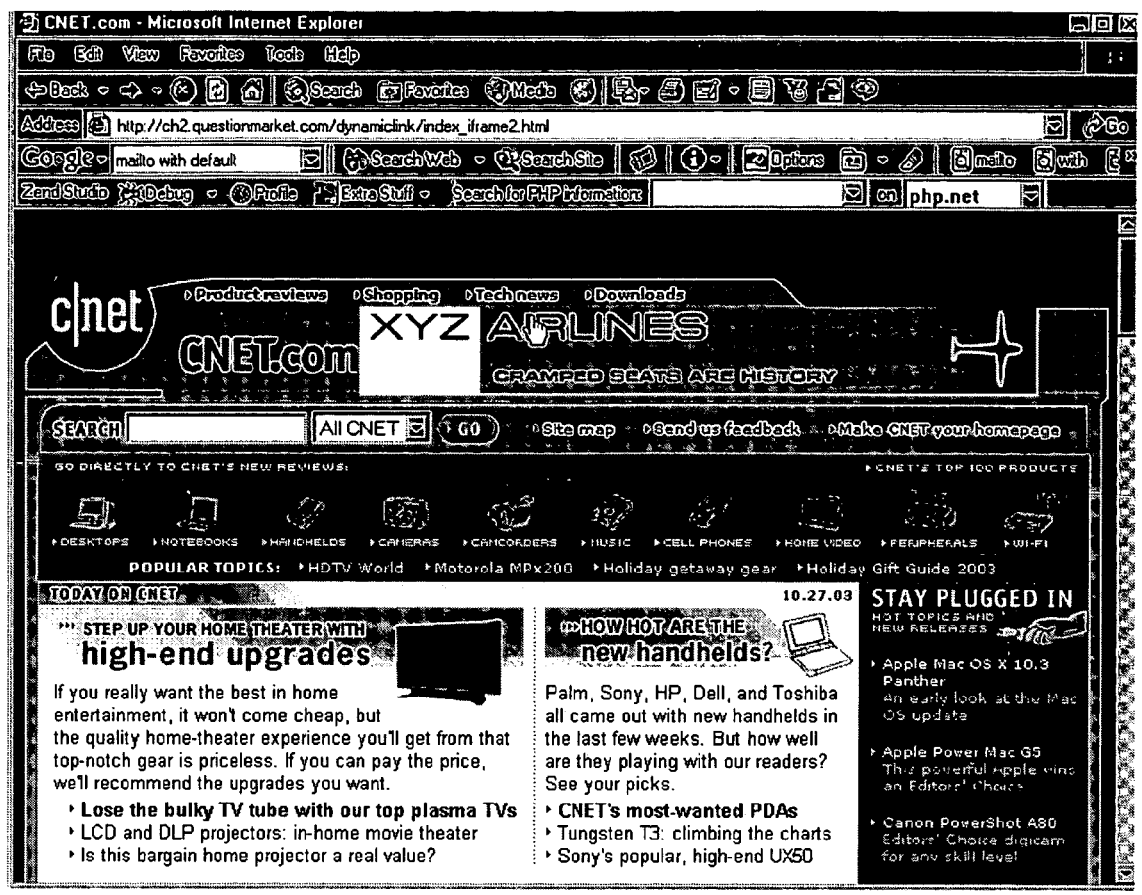
FIGS. 8-11 depict a set of illustrative screen shots corresponding to sequences of actions associated with a user session that is temporarily interrupted to invite the user to take an on-line survey.

Turning to the FIGS. 8-11, a set of exemplary screen shots are depicted in accordance with an embodiment of the present invention. Turning to FIG. 8, a user is surfing the web, and accesses a web page containing the "xyz Airlines" ad that includes the link replacement-invoking tag. Therefore, assuming a replacement criterion is met, the links on the web page will be replaced by a link to an on-line survey page after a configurable delay period of "x" seconds.

Figure 9:
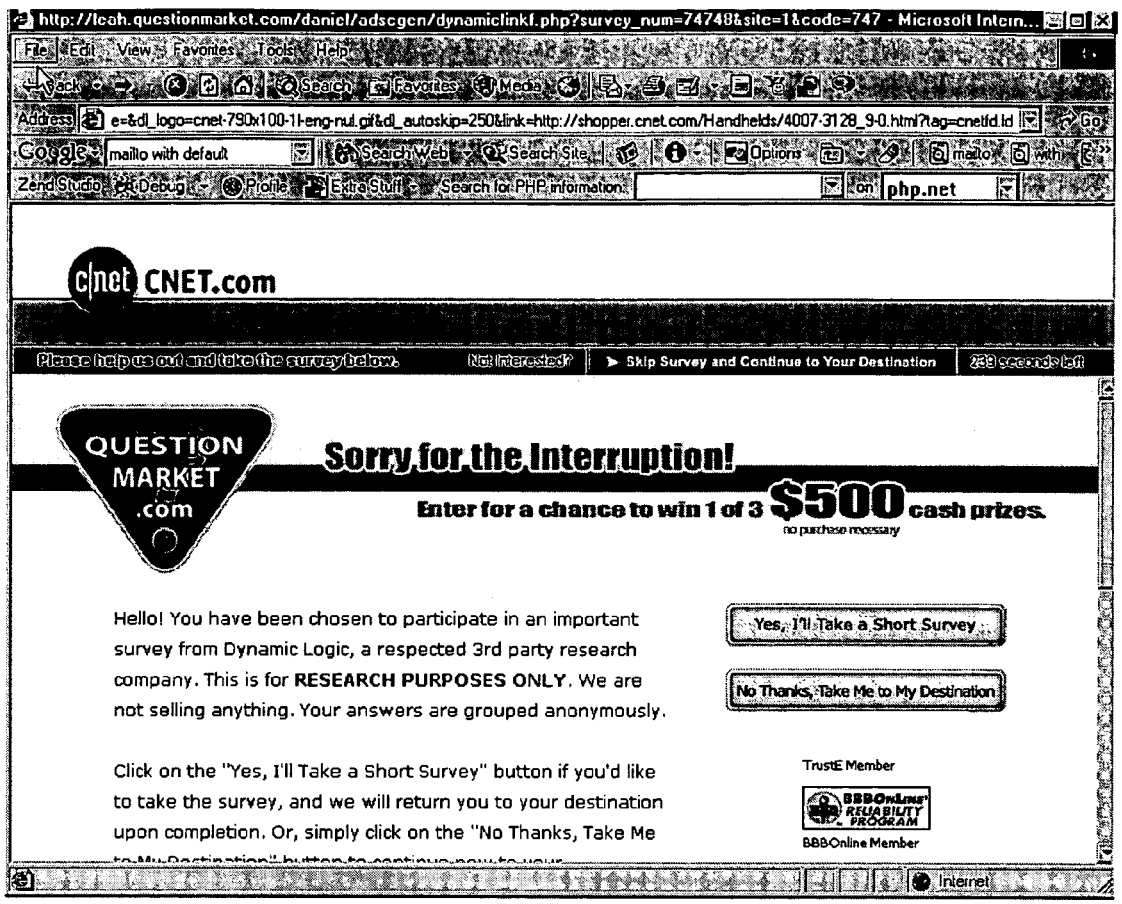

Turning to FIG. 9, the user clicked one of the "changed links" which takes the user to the depicted survey invitation page. Clicking the "back" button at this point will take the user back to the previous page, in its original look, with no dynamically changed links. The survey invitation page will remain up for "y" seconds, and if neither of the two buttons was clicked it will automatically take the user to the originally requested destination. The co-branding (e.g., CNET logo) of the survey invitation is indicated at the top of the page.

Figure 10:

Turning to FIG. 10, a user has selected the option "No, Take me to my destination" thereby taking the user to the originally linked web page (prior to link replacement). Clicking the browser's 'back' button takes the user back to the original page.

Figure 11:
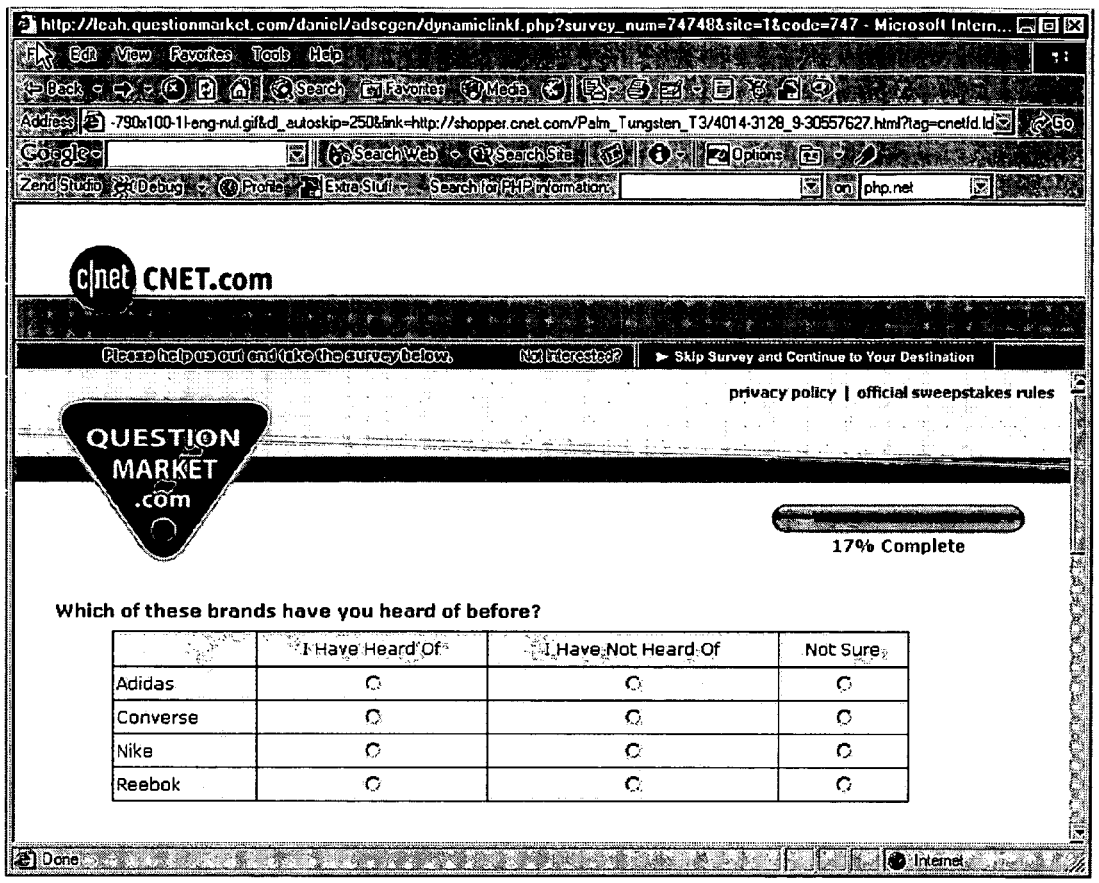

Turning to FIG. 11, a user clicked the button "Yes, I will take a short survey" which takes the user to the actual survey page. The user can click the red button at the top to quit the survey and continue to an originally requested destination. Clicking the back button will take him back to the original page. The co-branding theme remains throughout the survey.

It can thus be seen that a new a useful method and system for conducting an on-line survey have been provided. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrative embodiment shown in software may be implemented in hardware and vice versa or that the illustrative embodiment can be modified in arrangement and detail without departing from the spirit of the invention. Therefore, the invention as described herein contemplates all such embodiments as may come within the scope of the following claims and equivalents thereof.

I claim:

1. A computer-implemented method for conducting an on-line survey, the method comprising:

receiving a request for a block of data, the requested block of data comprising computer-readable instructions for displaying an on-line advertisement within a first displayed page, the request originating from a user computer;

providing an on-line advertisement to the user computer;

replacing links on the first displayed page with links to a page relating to the on-line survey in accordance with a computer-readable instruction contained within the on-line advertisement;

retrieving the page relating to the on-line survey in response to a selection of one of the replaced links on the first displayed page, wherein the retrieving step comprises retrieving an invitation to take a survey relating to the on-line advertisement, and providing a link to a second page, wherein the link to the second page corresponds to a link replaced by the selected link of the retrieving step, thereby enabling a user to access an originally intended page and bypass the survey.

2. The method of claim 1 wherein the on-line advertisement is provided within an HTML IFRAME construct, and further comprising the steps of:

maintaining at a supplier server of the first displayed page, a link replacement module containing computer-readable instructions for facilitating performing the step of replacing links on the first displayed page.

3. The method of claim 1 further comprising providing a link to the first displayed page.

4. The method of claim 1 wherein replacing links on the first displayed page takes place in accordance with one or more link replacement criteria.

5. The method of claim 4 wherein one of the link replacement criteria specifies a time delay for replacing the links on the page.

6. The method of claim 4 wherein one of the link replacement criteria specifies a text filter for performing the replacing links step.

7. The method of claim 1 further comprising associating a brand with the on-line survey wherein the brand relates to the first displayed page.

8. The method of claim 1 further comprising, after the retrieving step, waiting for an inactive period, and thereafter displaying a second page, wherein the second page corresponds to a link replaced by the selected link of the retrieving step, thereby enabling a user to access an originally intended page and bypass the survey through inaction.

9. A system for conducting an on-line survey, the system comprising:

a client computer for interacting with a user;

a web server in communication with the client computer;

a survey logic server in communication with the client computer; and computer-readable instructions for performing, by the client, web server, and survey logic server, in concert, the steps of:

providing an on-line advertisement to the user computer;

replacing links on the first displayed page with links to a page relating to the on-line survey in accordance with a computer-readable instruction contained within the on-line advertisement;

retrieving the page relating to the on-line survey in response to a selection of one of the replaced links on the first displayed page, wherein the retrieving step comprises retrieving an invitation to take a survey relating to the on-line advertisement; and providing a link to a second page. wherein the link to the second page corresponds to a link replaced by the selected link of the retrieving step, thereby enabling a user to access an originally intended page and bypass the survey.

10. The system of claim 9 wherein the on-line advertisement is provided within an HTML IFRAME construct, and wherein computer-readable instruction perform the further the steps of: maintaining at a supplier server of the first displayed page, a link replacement module containing computer-readable instructions for facilitating performing the step of replacing links on the first displayed page.

11. The system of claim 9 further comprising computer-readable instructions for providing a link to the first displayed page.

12. The system of claim 9 wherein replacing links on the first displayed page takes place in accordance with one or more link replacement criteria applied by the web server.

13. The system of claim 12 wherein one of the link replacement criteria specifies a time delay for replacing the links on the page.

14. The system of claim 12 wherein one of the link replacement criteria specifies a text filter for performing the replacing links step.

15. The system of claim 9 further comprising computer-readable instructions for associating a brand with the on-line survey wherein the brand relates to the first displayed page.

16. The system of claim 9 further comprising computer-readable instructions for waiting, after the retrieving the page step, for an inactive period, and thereafter displaying a second page, wherein the second page corresponds to a link replaced by the selected link of the retrieving step, thereby enabling a user to access an originally intended page and bypass the survey through inaction.

* * * * *